2 Sheets—Sheet 1.

W. H. PEASE.

TOBACCO-CUTTER.

No. 6,728. Reissued Nov. 2, 1875.

Witnesses:
W. M. Kinnear
J. S. Brown.

Inventor:
Nebelon H. Pease
By his Atty
L. D. Smith

N. PETERS, PHOTO-LITHOGRAPHER, WASHINGTON, D. C.

W. H. PEASE.

TOBACCO-CUTTER.

No. 6,728. Reissued Nov. 2, 1875.

Witnesses:
A. M. Kinnouse.
J. S. Brown

Inventor:
Webster H. Pease
By his atty R. D. O. Smith

N. PETERS, PHOTO-LITHOGRAPHER, WASHINGTON, D. C.

UNITED STATES PATENT OFFICE.

WEBSTER H. PEASE, OF EDGERTON, WISCONSIN.

IMPROVEMENT IN TOBACCO-CUTTERS.

Specification forming part of Letters Patent No. 30,929, dated December 18, 1860; extended seven years; reissue No. 6,728, dated November 2, 1875; application filed September 3, 1875.

*To all whom it may concern:*

Be it known that I, WEBSTER H. PEASE, formerly of Dayton, Ohio, but now of Edgerton, Rock county, Wisconsin, have invented a Tobacco-Cutting Machine, of which the following is a specification:

My invention consists, first, in endless chains running over continuous guide-surfaces and rolls set with relation to each other, so as to form or constitute between them a converging throat, rigid as to lateral pressure, two sides of which move forward simultaneously and continuously, and compress and feed the leaves which enter loosely between them; second, in a rigid and unyielding throat behind the shearing-bar, through which the tobacco is forced to the cutters, said throat being provided with knife-edges at the back, to take the plug from the chains; third, in mounting upon the main shaft, which is actuated by the prime mover, both the driver for the feeding and compressing chains or belts, and the rotating cutters, and so arranging the connecting-gears that the movements of these parts will be coincident.

That others may fully understand my invention, I will particularly describe it, having reference to the accompanying drawings, wherein—

Figure 1:
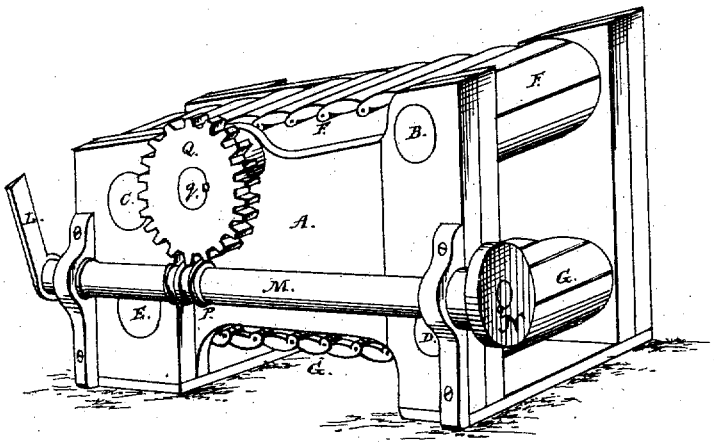
Figure 2:
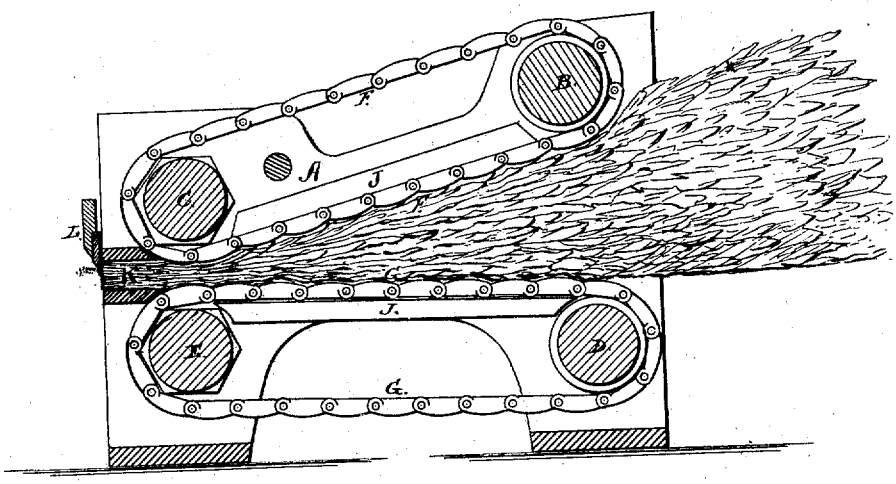
Figure 3:
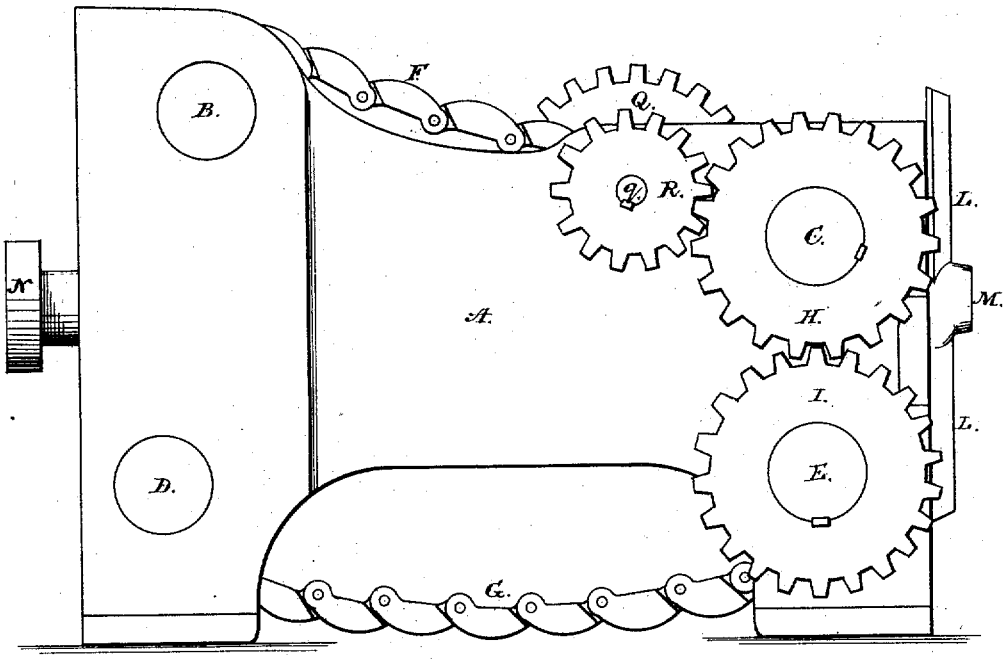
Figure 4:
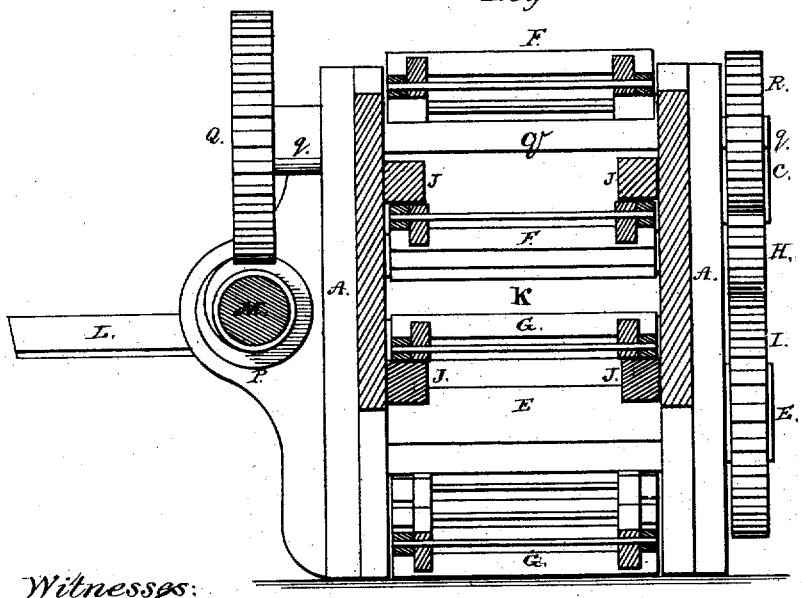

Figure 1 is a perspective view of my machine. Fig. 2 is a longitudinal section of the same. Fig. 3 is a side elevation. Fig. 4 is a transverse section of my machine.

A is a substantial frame, constructed of any suitable size or material. Across this frame, and having their bearings in it, are four rollers, B B and C E, the latter two being nearer together than the former two. F G are two endless belts or chains, made of metal or any other suitable material. The chain or belt passes around the rollers B C, and the chain or belt G similarly passes around the rollers D E, so that there is a converging space between said belts or chains, and if they are simultaneously moved, any object placed between them will be carried forward, and at the same time compressed as said belts or chains approach each other. The rollers C E are fashioned so as to adapt themselves to the under surfaces of the belts or chains, and to engage therewith, so as to cause said belts or chains to move whenever said rollers revolve, and being geared together by means of the gear-wheels H I, said rollers are coincident in their revolution. Said chains or belts run upon continuous guide-surfaces J, placed longitudinally between the sides of the frame, where they will support and give direction to those portions of said chains or belts which for the time being form the converging carrier and press, and sustain the pressure or resistance of the substance which is being compressed. I prefer to employ chains, as shown, and with them the supporting-guides may be merely continuously ledges or ribs J, placed so as to enable them to support the ends of the links of the several chains. Without guide-surfaces behind the chains or belts for this purpose, they would yield to the outward pressure or resistance of the substance being compressed, and the labor of compression, instead of being gradual, would be almost entirely borne by the inner rollers C E. The upper surface of each link of said chains constitutes a segment of a cylinder, and as said links pass over the driving-roller, said segment moves around the axis of said roller, which is coincident with its own cylindrical axis. The value of this provision is, it enables the inner edges of the rigid throat K, through which the tobacco is forced to the cutting-knives, to approach so close to the moving surface of the chain as may be necessary to prevent the passage of any portion of the tobacco down between the throat and chain. This is necessary to prevent the choking and stopping of the machine. The rear upper and lower edges of the throat K are, therefore, made thin and sharp, and they are adjusted to take the tobacco smoothly from the surface of the chains at a point where the moving surfaces of the chain-links form segments of a revolving cylinder. The cutting-knives L consist of two cutting-blades projecting laterally from and at right angles to the axis of the shaft M. These knives are so mounted that the line of their cutting-edges, if prolonged, would about cut their axis of revolution, so that they strike squarely upon the top of the plug, or very nearly so, and they are adjusted to shear upon the front or mouth end of the throat K.

The shaft M revolves in bearings secured to the side of the frame A, and its end opposite to the cutters L is provided with a belt-pulley, N, whereby motion is received from the prime mover. At an intermediate point on said shaft M there is a worm-wheel, P, and said worm-wheel gears or meshes with a gear-wheel, Q, upon a transverse shaft, *q*, which rests in bearings in the frame A. Said shaft *q* has a pinion, R, at its opposite end, which transmits the motion of said shaft Q to the feed-wheels H I, so that the revolution of the single shaft M is the source from which both the feeding and cutting devices derive their motion, and they therefore move with a uniform relative speed, so that, while in operation, the cutting will be constant in degree of fineness.

It is evident that by changing the velocity of either the feeding or cutting device will be determined the fineness of the cut—that is to say, the revolution of the knives being at a given rate, an increased feed will produce a coarse cut, and a decreased feed the opposite.

During the operation of cutting it is necessary to stop the machine frequently to replace the dull knives with sharp ones, and at such time the chains are moved backward a little way for the purpose of relieving the tobacco of a portion of the pressure, and to prevent the outward swelling or bulging of the middle of the plug, which would otherwise take place, and which, in the machines heretofore used, caused the first cut of the knife to be of irregular fineness.

When stopping the machine at night the chains are moved backward far enough to relieve the tobacco of nearly or quite all of the pressure, and in that condition it may remain over night without deterioration.

It will be perceived from the above description, first, that the pressing and feeding are coincident, automatic, and continuous; second, that therefore the labor of attendants consists in feeding the loose leaves and replacing dull knives with sharp ones; third, that, the operation being continuous from one day to another, no waste butts will be made.

Having described my invention, what I claim as new is—

1. The automatic and continuous feed and press herein described, consisting essentially of endless chains or belts provided with rigid and continuous guides, and supported and operated by rolls, relatively situated to form a converging throat.

2. The endless chains F G, both provided with rigid and continuous guide-surfaces, supported and operated by rolls relatively situated to form a continuous feed and press, combined with a rigid throat, K, through which the compressed matter is delivered.

3. The combination of means for making positive and direct connection between the rotating cutter and converging endless chains, consisting of the combination of the chain-carrying rollers, geared positively together, and they, in turn, geared positively to the shaft that carries the knife.

4. Combined with the chain-carrying rollers C E, the shaft M, bearing the cutter at one end, and provided with the worm P and intermediate positive gearing, whereby motion of said shaft is transmitted to said rollers.

W. H. PEASE.

Witnesses:
E. A. BURDICK,
T. S. WHITCOMB.